United States Patent [19]

Fischer et al.

[11] 4,377,611
[45] Mar. 22, 1983

[54] PLASTIC TRANSPARENCIES HAVING IMPROVED RESISTANCE TO CRACKING

[75] Inventors: William F. Fischer, Orange; Charles A. Bailey, II, Santa Ana, both of Calif.

[73] Assignee: Swedlow, Inc., Santa Ana, Calif.

[21] Appl. No.: 220,958

[22] Filed: Dec. 29, 1980

[51] Int. Cl.³ .............................................. B32B 23/02
[52] U.S. Cl. .................................. 428/192; 264/291; 427/164; 428/520
[58] Field of Search ...................... 428/192, 336, 520; 427/164; 264/291

[56] References Cited

U.S. PATENT DOCUMENTS

| | | | |
|---|---|---|---|
| 2,817,618 | 12/1957 | Hahn | 428/517 X |
| 2,912,716 | 11/1959 | Frownfelter et al. | 425/73 X |
| 2,918,696 | 12/1959 | Bottoms et al. | 264/156 X |
| 2,991,207 | 7/1961 | Miller | 156/99 X |
| 2,991,209 | 7/1961 | Worrall | 428/911 X |
| 3,398,044 | 8/1968 | Plueddemann | 428/268 |
| 3,409,344 | 11/1968 | Balint et al. | 404/14 X |
| 3,424,642 | 1/1969 | Orcutt | 428/38 |
| 3,562,383 | 2/1971 | Ayres | 428/192 X |
| 3,596,311 | 8/1971 | Salmon | 425/383 |
| 3,632,841 | 1/1972 | Fortin | 264/291 X |
| 3,764,445 | 10/1973 | Olson | 428/188 |
| 3,833,451 | 9/1974 | Wagner | 156/107 X |
| 3,843,474 | 10/1974 | Golden et al. | 428/31 X |
| 3,935,368 | 1/1976 | Weiss | 428/337 |
| 4,118,454 | 10/1978 | Miki et al. | 264/291 X |

FOREIGN PATENT DOCUMENTS 2397927  2/1979  France.
1065780  4/1967  United Kingdom.

*Primary Examiner*—Henry F. Epstein
*Attorney, Agent, or Firm*—Fulwider, Patton, Rieber, Lee & Utecht

[57] ABSTRACT

A plastic transparency for particular use as an airplane window, including a transparent sheet member and a thin resinous coating overlying the peripheral edge surface of the sheet member. The sheet member is formed of a multi-axially oriented plastic material that is absorptive of moisture, the volume of the member varying in accordance with the amount of moisture absorbed. The edge coating has a moisture permeation rate substantially less than that of the underlying sheet member, so when the window is exposed to an environment of high or variable humidity, any moisture gradient adjacent the peripheral edge surface is reduced, and the resultant tensile stress and incidence of cracking in the window are correspondingly reduced.

7 Claims, 4 Drawing Figures

PLASTIC TRANSPARENCIES HAVING IMPROVED RESISTANCE TO CRACKING

BACKGROUND OF THE INVENTION

This invention relates generally to plastic transparencies, and, more particularly, to transparencies formed of a multi-axially oriented (e.g., biaxially-oriented) plastic sheet material.

Plastic transparencies of this type are of particular use as airplane windows, especially when manufactured of stretch-modified polymethyl methacrylate meeting MIL-P-25690. Suitable methods and apparatus for forming such a stretched acrylic plastic material are described in U.S. Pat. Nos. 2,912,716 (Frownfelter et al), 2,918,696 (Bottoms et al), 3,596,311 (Salmon), and 3,632,841 (Fortin).

One drawback to the use of stretched acrylic as airplane windows is that cracks will frequently develop in the windows. These fractures ordinarily begin as crazes in the peripheral edge surface of the window and propagate inwardly after a period of use. The fractures are usually oriented in the plane of the transparencies, because of the anisotropic nature of the multi-axially oriented material. It has been observed that these in-plane fractures tend to occur much sooner in transparencies exposed to high humidity environments.

Plastic airplane windows of this type are customarily mounted using edge seals that serve to both eliminate pressure leaks and conceal edge cracks. For example, passenger airline cabin windows commonly use a rubber gasket around their peripheries, and cockpit windows and windshields, which are usually laminates of stretched acrylic and glass or other material, commonly used edge sealants formed of silicone rubber or polysulfide material. These sealants are opaque and are usually applied like putty, in thicknesses of about 0.060 to 1.100 inches.

Efforts have been made in the past to reduce these in-plane fractures, but apparently without success. In one known effort, abrasion-resistant coating materials based on polysiloxane chemistry were evaluated as edge sealants for cabin windows. However, no significant reduction in the occurrence of peripheral edge cracking in the windows was observed.

It therefore will be appreciated that there is a definite need for an improved plastic transparency for particular use as an airplane window, having an improved resistance to cracking in its peripheral edge surface, especially in a high humidity or variable humidity environment. The present invention fulfills this need.

SUMMARY OF THE INVENTION

The present invention is embodied in a plastic transparency having improved resistance to cracking in its peripheral edge surface when exposed to an environment of high or variable humidity. The transparency includes a transparent sheet member formed of a multiaxially oriented material that is absorptive of moisture, the volume of the sheet member varying in accordance with the amount of moisture absorbed. In accordance with the invention, the transparency further includes a thin, resinous coating overlying the peripheral edge surface of the transparent sheet member, the coating having a moisture permeation rate substantially lower than that of the underlying sheet member. As a result, when the transparency is exposed to an environment of high or variable humidity, the magnitude of any moisture gradient adjacent the peripheral edge surface, and the concomitant propagation of cracks into the transparency from that edge surface, are reduced.

More particularly, the present invention has particular utility when used in connection with stretched polymethyl methacrylate transparencies, especially stretch-modified polymethyl methacrylate transparencies meeting MIL-P-25690. Suitable polymer materials for use at the edge coating include poly(vinylidene chloride), poly(tetrafluoroethylene), chlorinate polyether, poly(vinylidene fluoride), polyethylene, poly(vinyl chloride), butyl rubber, poly(ethyleneterephthatate), neoprene, and nitrile elastomers. All of these polymers have moisture permeation rates substantially lower than that of stretched polymethyl methacrylate. The edge coating is preferably applied to a thickness of at least about 0.00025 inches.

Other aspects and advantages of the present invention will become apparent from the following description of the preferred embodiment, taken in conjunction with the accompanying drawings, which illustrate, by way of example, the principles of the invention.

DESCRIPTION OF THE PREFERRED EMBODIMENT

Figure 1:
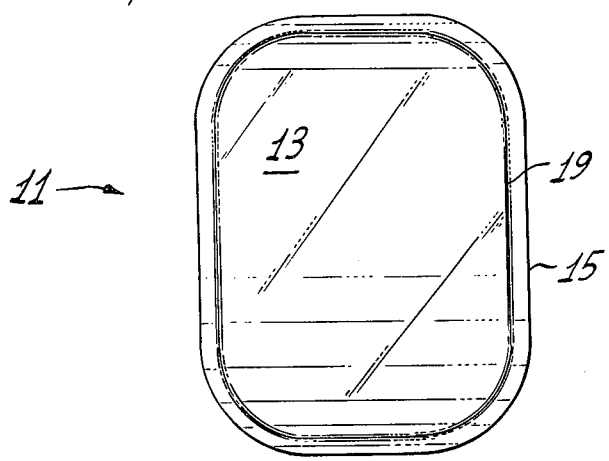
FIG. 1 is a plan view of a plastic window having a thin, resinous coating on its peripheral edge surface, in accordance with the present invention.
Figure 2:
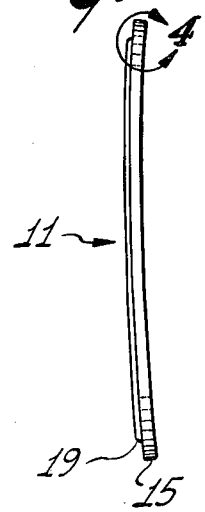
FIG. 2 is a side elevational view of the plastic window of FIG. 1.
Figure 3:
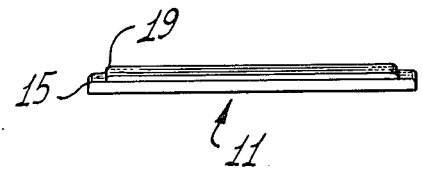
FIG. 3 is a top view of the plastic window of FIG. 1.
Figure 4:
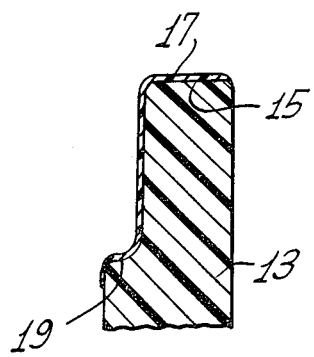
FIG. 4 is an enlarged, sectional view (not to scale) of the peripheral edge portion of the plastic window, as shown in FIG. 2.

As shown in the exemplary drawings, the present invention is embodied in a plastic airplane window 11 that includes a transparent sheet member 13 formed of stretch-modified polymethyl methacrylate meeting MIL-P-25690. This stretched acrylic sheet member is highly absorptive of moisture, absorbing as much as 5 percent of its weight in water, with a concomitant swelling or volume expansion. When subsequently dried, the rate of desorption or water loss is greater at the surface of the sheet than below its surface, producing a substantial moisture gradient. This moisture gradient causes the surface of the sheet to seek a reduction in its size, while the interior of the sheet seeks to retain its enlarged volume because of its higher water content. As a result, the surface of the sheet is placed under considerable tensile stress.

The aforementioned tensile stress in the surface of the stretched acrylic sheet 13 can cause crazing and eventually cracks in the surface. Continued exposure to an environment of variable or high humidity results in the propagation of the cracks a considerable distance into the sheet. For this reason, stretched acrylic sheets, by themselves, have not proven entirely satisfactory for use as airplane windows. Since the stretched acrylic sheet 13 has a multi-axially oriented structure, its tensile strength is much higher in the plane of the sheet than perpendicular to it. Accordingly, the crazes and cracks tend to occur preferentially in the peripheral edge surface 15 of the sheet, parallel to the plane of the sheet, and to propagate inwardly from that surface.

In accordance with the invention, the window 11 further includes a thin, resinous edge coating 17 overlying the peripheral edge surface 15 of the underlying stretched acrylic sheet 13. The coating has a moisture permeation rate substantially lower than that of the underlying acrylic sheet, whereby when the window is exposed to an environment of high or variable humidity, the magnitude of any moisture gradient adjacent the edge surface is reduced. The concomitant tensile stress in the edge surface, and the propagation of cracks into the window from that surface, are thereby correspondingly reduced.

As shown in the drawings, the peripheral edge surface 15 of the window 11 includes a rabbeted edge segment 19 that extends completely around the window and is perpendicular to the plane of the window. It is important that the edge coating 17 overlie this edge segment as well, since a moisture gradient adjacent this segment will likewise promote crazing and eventually cracking.

The stretched acrylic sheet 13 typically has a water permeation rate of about 470 Kg×cm/km², at 38° C. and 100 percent relative humidity. Accordingly, the moisture gradient occuring adjacent the peripheral edge surface 15 of the window 11 can be reduced by forming the resinous edge coating 17 of a material having a water permeation rate substantially lower than this value. Suitable materials for this edge seal film are listed in TABLE I, along with the respective water permeation rate for each:

TABLE I

| Polymer | Water Permeation Rate Kg × cm/km² at 38° C. (100% RH) |
| --- | --- |
| Poly(vinylidene chloride) | 7.9 |
| Poly(tetrafluoroethylene), Teflon | 10 |
| Chlorinated polyether, Penton | 20 |
| Poly(vinylidene fluoride), Kynar | 39 |
| Polyethylene | 20-60 |
| Poly(vinyl chloride) | 90-120 |
| Butyl rubber | 80 |
| Poly(ethylene terephthalate) | 80-160 |
| Neoprene | 200 |
| Nitrile elastomers | 200-240 |

The edge coating 17 can be applied to the peripheral edge surface 15 of the window 11 using a variety of conventional techniques, including painting, flow coating, dipping, spraying, and wiping. The resins can be applied from polymer solutions in suitable solvents or from aqueous and non-aqueous emulsions or suspensions. The coating can be air dried, or dried more rapidly at an elevated temperature or under a vacuum. Alternatively, the edge coating can be applied by shrink wrapping, heat sealing, or adhesive sealing as with an adhesive tape. Heat sealing or oven drying must be conducted at temperatures below the shrink back or relaxation temperature of the underlying stretched acrylic sheet 13, i.e., about 220° F.

When applying the moisture barrier edge coating 17 using a solvent, the solvent must be selected such that it does not attack the underlying stretched acrylic sheet 13. Suitable solvents include, for example, water, heptane, isooctane, toluene, methanol, ethanol, isopropanol, lacquer thinner, dibutyl sebacate, and mixtures thereof. Solvents that are believed to be particularly unsuited for use in applying the moisture barrier edge coating 17 include acetone, ethyl acetate, ethylene dichoride, dimethyl formamide, and mixtures thereof.

The moisture barrier edge coating 17 is preferably applied to the entire peripheral edge surface 15 of the underlying stretched acrylic sheet 13, to a thickness of at least about 0.00025 inches. In general, greater thicknesses will provide increased moisture sealing; however, for coating thicknesses greater than about 0.0006 inches, multiple layers may be required.

The advantages of the aforedescribed invention will be better understood from a review of the following examples:

EXAMPLE

Four parts by weight of a poly(vinylidene chloride) emulsion, sold by the Union Oil. Co. under the trademark Amsco Res P-542, was mixed with 1 part by weight of isopropanol alcohol. The Amsco Res P-542 emulsion is believed to have a solid content of 46%, with a water base. The resultant emulsion was applied to the peripheral edge surface of a stretched acrylic airplane cabin window meeting MIL-P-25690. After drying, the resultant edge coating had a thickness of about 0.0003 to 0.0006 inches. Both the edge-coated window and an untreated control window were then exposed to an environment of 165° F. and 100 percent relative humidity. In-plane fractures (greater than 1/32 inch) occurred in the untreated window after just 54 days, whereas such fractures did not occur in the edge-sealed window for 95 days.

It will be appreciated from the foregoing description that the present invention provides a transparency having improved resistance to crack propagation when exposed to an environment of high or variable humidity. The transparency includes a thin, resinous coating overlying the peripheral edge surface of a transparent sheet member, and the water permeation rate of the resinous coating is substantially lower than that of the underlying transparent sheet, such that the magnitude of any moisture gradient adjacent the edge surface is reduced. The resultant tensile stress in the edge surface, and the concomitant propagation of cracks into the transparency, are correspondingly reduced.

Although the present invention has been described in detail with reference to its presently preferred embodiment, it should be understood by those of ordinary skill in the art that various modifications can be made, without departing from the spirit and scope of the invention. Accordingly, it is not intended that the invention be limited, except as by the appended claims.

We claim:

1. A transparency having improved resistance to crazing and cracking when exposed to an environment of variable humidity, the transparency comprising:

a transparent, plastic sheet member having a peripheral edge surface, the sheet member being formed of a multiaxially oriented material that is absorptive of moisture, the volume of the sheet member varying in accordance with the amount of moisture absorbed; and a thin, resinous coating overlying the peripheral edge surface of the sheet member and in direct contact with it, the resinous coating having a moisture permeation rate substantially lower than that of the underlying sheet member, whereby the magnitude of any moisture gradient adjacent the edge surface, caused by an environment of variable humidity, is reduced and the concomitant incidence of crazing and cracking in the transparency is correspondingly reduced.

2. A transparency as defined in claim 1, wherein the transparent sheet member is formed of stretched polymethyl methacrylate.

3. A transparency as defined in claim 2, wherein the thin resinous coating is formed of a material selected from the group consisting of polyvinylidene chloride, polytetrafluoroethylene, chlorinated polyether, polyvinylidene fluoride, polyethylene, polyvinyl chloride, butyl rubber, polyethylene terephthalate, neoprene, and nitrile elastomers.

4. A transparency as defined in claim 1, wherein the thin resinous coating has a thickness of at least about 0.00025 inches.

5. In a transparency including a transparent, plastic sheet member having a peripheral edge surface, wherein the sheet member is formed of a multi-axially oriented material that is absorptive of moisture, the volume of the sheet member varying in accordance with the amount of moisture absorbed, an improvement comprising:

a thin, resinous coating overlying the peripheral edge surface of the sheet member and in direct contact with it, the resinous coating having a moisture permeation rate substantially lower than that of the underlying sheet member, whereby the magnitude of any moisture gradient adjacent the edge surface, caused by an environment of variable humidity, is reduced and the concomitant incidence of crazing and cracking in the edge surface of the transparency is correspondingly reduced.

6. An improvement as defined in claim 5, wherein:
the transparent sheet member is formed of stretched polymethyl methacrylate; and
the thin, resinous coating is formed of a material selected from the group consisting of polyvinylidene chloride, polytetrafluoroethylene, chlorinated polyether, polyvinylidene fluoride, polyethylene, polyvinyl chloride, butyl rubber, polyethylene terephthalate, neoprene, and nitrile elastomers.

7. An improvement as defined in claim 6, wherein the thin resinous coating has a thickness of at least about 0.00025 inches.

* * * * *

UNITED STATES PATENT AND TRADEMARK OFFICE
CERTIFICATE OF CORRECTION

PATENT NO. : 4,377,611

DATED : Mar. 22, 1983

INVENTOR(S) : Fischer et al.

It is certified that error appears in the above-identified patent and that said Letters Patent is hereby corrected as shown below:

Claim 7, line 1, delete "6" and insert therefore -- 5 --.

Signed and Sealed this

Nineteenth Day of July 1983

[SEAL]

Attest:

GERALD J. MOSSINGHOFF

Attesting Officer

Commissioner of Patents and Trademarks